(12) United States Patent
Mayer

(10) Patent No.: US 6,578,939 B1
(45) Date of Patent: Jun. 17, 2003

(54) UNIVERSAL SLIDING RAIL ASSEMBLY FOR RACK MOUNTING COMPUTERS

(75) Inventor: David W. Mayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/697,469

(22) Filed: Oct. 26, 2000

(51) Int. Cl.[7] ............................................... A47B 88/00
(52) U.S. Cl. ................ 312/334.5; 312/334.8; 403/188; 403/194; 411/531
(58) Field of Search .................... 211/26, 189, 190; 312/265.1, 265.4, 334.1, 334.5, 334.8; 248/201; 411/531; 403/187, 188, 192, 194; 361/829, 725, 727, 825

(56) References Cited

U.S. PATENT DOCUMENTS

| | | | | |
|---|---|---|---|---|
| 2,278,790 A | * | 4/1942 | Langmaid | |
| 3,181,902 A | * | 5/1965 | Aitken | |
| 5,172,608 A | * | 12/1992 | Schultz et al. | ................ 403/11 |
| 5,209,356 A | * | 5/1993 | Chaffee | |
| 5,571,256 A | * | 11/1996 | Good et al. | |
| 5,833,337 A | * | 11/1998 | Kofstad | |
| 6,021,909 A | * | 2/2000 | Tang et al. | |
| 6,070,957 A | * | 6/2000 | Zachrai | |
| 6,269,959 B1 | * | 8/2001 | Haworth | |
| 6,270,281 B1 | * | 8/2001 | Ruusuvuori | .................. 403/11 |
| 6,305,556 B1 | * | 10/2001 | Mayer | |

* cited by examiner

Primary Examiner—Korie Chan
(74) Attorney, Agent, or Firm—Kevin M. Hart

(57) ABSTRACT

A sliding rail assembly adjusts and adapts to fit various racks. An adjustable mounting flange on an end of the rail assembly translates along the axis of the rail so that the length of the rail assembly adjusts to fit racks having various depths. Hooks on the rail assembly may be used to hang the rail assembly on the rack while the rail assembly is being installed therein. The hooks are removable so that the rail assembly will fit racks having narrow widths. Mounting adapters enable the mounting flanges to mate with corner posts having round holes as well as those having square holes. Securing tabs engage front corner posts of the rack to prevent the rail and the computer enclosure from sliding out. To accommodate racks having various depths, the securing tabs may be mounted at more than one location on the side of the computer enclosure.

10 Claims, 5 Drawing Sheets

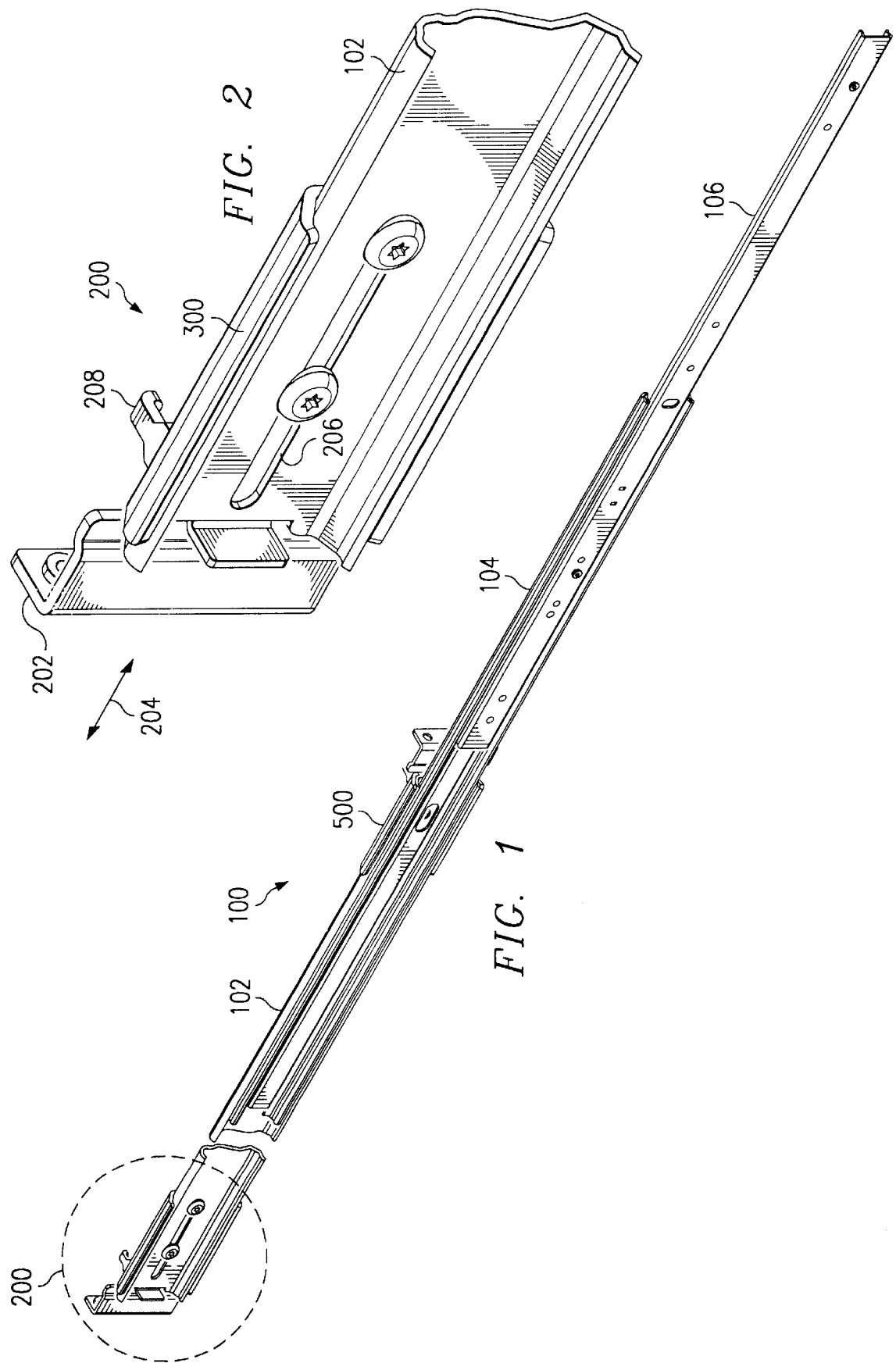

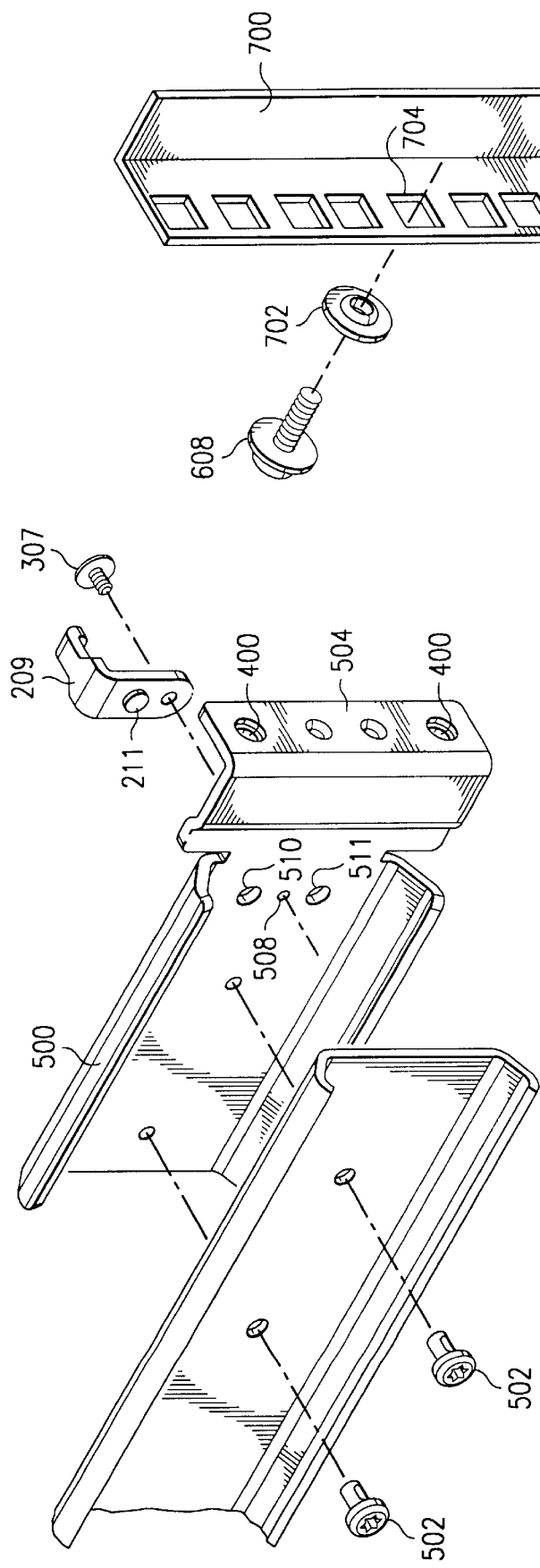
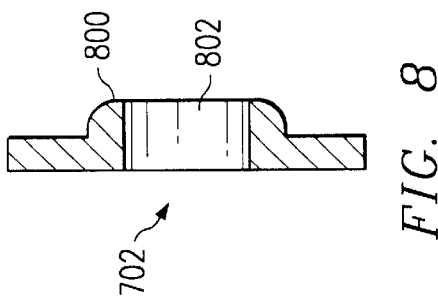

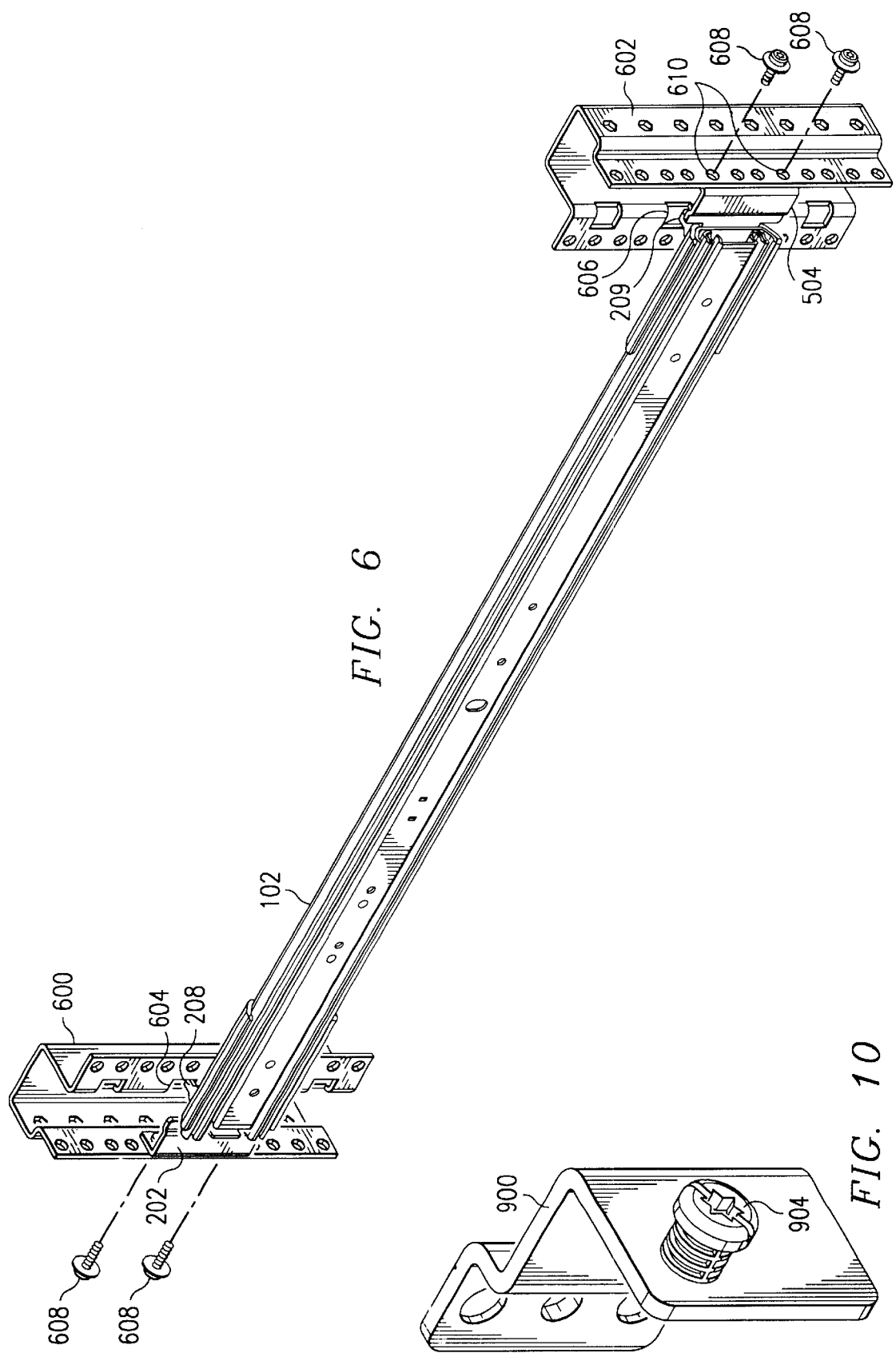

UNIVERSAL SLIDING RAIL ASSEMBLY FOR RACK MOUNTING COMPUTERS

FIELD OF THE INVENTION

This invention relates to rack mounting techniques for computer enclosures.

BACKGROUND

In commercial settings, multiple computer enclosures are sometimes mounted in a vertical rack structure. This technique is referred to as "rack mounting," and is most frequently used with server-type computers that are accessed remotely via a network. Most rack structures include four vertical corner posts. Several pairs of horizontal sliding rail assemblies are attached to the corner posts to create slots or drawers in which the computer enclosures are received.

Although most rack structures are built to comply with an Electronics Industry Association ("EIA") standard, the EIA standard specifies only a few of the features and dimensions that constitute a rack. Consequently, many of the features and dimensions of commercially available rack structures are "non-standard." That is, they differ substantially from one manufacturer to another. For this reason, a sliding rail assembly supplied by one manufacturer typically cannot be mounted in a rack supplied by another manufacturer.

It would be desirable to have a sliding rail assembly that could be mounted in racks supplied by a variety of different manufacturers.

SUMMARY OF THE INVENTION

A sliding rail assembly according to the invention is adjustable and adaptable so that it may be installed into a variety of different kinds of rack structures. In one aspect, an adjustable mounting flange is disposed on at least one of the two ends of the rail assembly. The adjustable mounting flange may be translated along the axis of the rail so that the length of the rail assembly adjusts to fit rack structures having various depths. In another aspect, two or more hooks are disposed on the rail assembly and extend orthogonally away from the rail so that the rail assembly may be hung on a rack structure while the assembly is being installed into the rack. The hooks are removable so that the rail assembly will fit into racks having narrow widths. In a third aspect, mounting adapters are provided for the mounting flanges so that the rail assembly may be mounted into racks whose corner posts have either round mounting holes or square mounting holes. In an embodiment, the mounting adapters take the form of a centering washer. In a fourth aspect, adjustable securing tabs are provided for mounting on at least one of the sides of a computer enclosure. The securing tabs engage the front corner posts of the rack structure, thereby preventing the rail and the enclosure from sliding out of the rack. The securing tabs may easily be removed and replaced so that they can be mounted at more than one location on the side of the computer enclosure. In this manner, the securing tabs are adjustable so that they accommodate rack structures having various depths.

BRIEF DESCRIPTION OF THE DRAWINGS

FIG. 1 is an oblique view of a sliding rail assembly according to a preferred embodiment of the invention.

FIG. 2 is an oblique view of the adjustable mounting flange of FIG. 1.

FIG. 5 is an exploded view of the fixed mounting flange of FIG. 1.

FIG. 6 is an exploded view of the sliding rail assembly of FIG. 1 being mounted to two corner posts of a first rack structure.

FIG. 7 is an exploded view of a mounting screw and a centering washer being inserted in a corner post of a second rack structure according to a preferred embodiment of the invention.

FIG. 8 is a cross-sectional view of the centering washer of FIG. 7.

FIG. 10 is an oblique view of the securing tab of FIG. 9.

DETAILED DESCRIPTION OF THE PREFERRED EMBODIMENTS

An adjustable slide rail assembly according to the invention may be employed in a variety of different rack mounting structures. Typically, such a rack structure will include four vertical corner posts, each of the posts having a vertical series of holes formed therein. The vertical series of holes is provided so that slide rail assemblies or trays may be mounted at a number of different heights in the rack, thereby forming numerous slots for receiving computers and supporting them in a stacked arrangement.

FIG. 1 illustrates an adjustable slide rail assembly 100 according to a preferred embodiment of the invention. Normally, a pair of rail assemblies 100 would be installed at the same height on the left and right sides of a rack to create one slot for receiving a computer. In the embodiment shown, slide rail assembly 100 includes a fixed rail 102 and two telescoping extending rails 104, 106. Other types of sliding rail designs may be used in alternative embodiments of the invention. In the embodiment shown, fixed rail 102 would be fastened to front and rear corner posts of the rack, and extending rails 104 and 106 would be free to extend into and out of the rack by sliding within fixed rail 102 and within each other on ball bearings.

Figure 3:
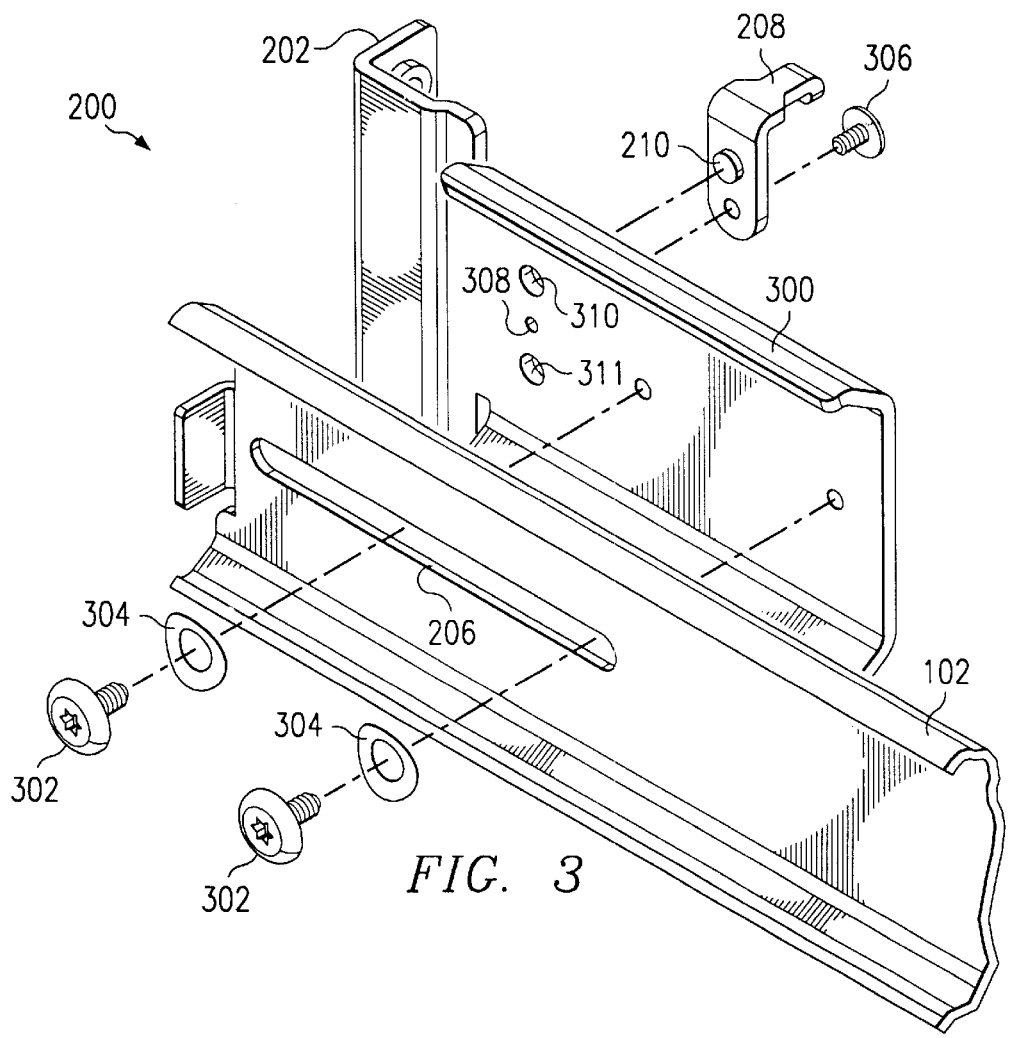
FIG. 3 is an exploded view of the adjustable mounting flange of FIG. 1.

FIGS. 2 and 3 illustrate a mounting system 200 for use with a sliding rail assembly such as that shown in FIG. 1. Corner post engagement surface 202 is capable of translational movement in the longitudinal direction 204 of slide rail assembly 100. The translational excursion of corner post engagement surface 202 is guided and limited by a channel 206 formed in fixed rail 102. In the embodiment shown, corner post engagement surface 202 is a flange that is integrally formed on the end of a bracket 300. Bracket 300 is shaped to fit around the back side of fixed rail 102. Bracket 300 is slidingly secured to fixed rail 102 with two screws 302. A spring washer 304 is inserted between the heads of screws 302 and the inside surface of fixed rail 102. Preferably, spring washers 304 provide enough friction so that bracket 300 will slide, but only with application of moderate force. The ability to translate corner post engagement surface 202 as shown constitutes a rack depth adjustment feature. To fit deep racks, bracket 300 may be moved so that the length of fixed rail 102 is effectively increased. To fit shallow racks, bracket 300 may be moved in the opposite direction so that the length of fixed rail 102 is effectively decreased. On the other end of fixed rail 102, a fixed bracket 500 is secured with two screws 502 as shown in FIG. 5. Like bracket 300, bracket 500 has a corner post engagement surface 504 integrally formed thereon.

Mounting system 200 also includes hooks 208, 209 for hanging slide rail assembly 100 on corner posts of the rack while corner post engagement surfaces 202, 504 are secured to the corner posts of the rack. In the embodiment shown, hooks 208, 209 are attached to brackets 300, 500 with screws 306, 307. Hooks 208, 209 may easily be removed by removing the screws. The removability of hooks 208, 209 constitutes a rack width adjustment feature. To fit slide rail system 100 into narrow racks, the hooks are removed. But for wider racks, the hooks are installed and are employed to make installation of rail system 100 easier. In the embodiment shown, three holes are provided on each of brackets 300, 500. One hole on each bracket (holes 308, 508) is for receiving a screw (screws 306, 307). The other two holes (holes 310, 311 on bracket 300 and holes 510, 511 on bracket 500) are for receiving a protrusion (210, 211) formed on the hook. Using the one screw hole and the two alternative holes for receiving the protrusion, hooks 208, 209 may easily be reversed so that the same rail assembly 100 may be mounted either on the left side or on the right side of a rack.

Figure 4:
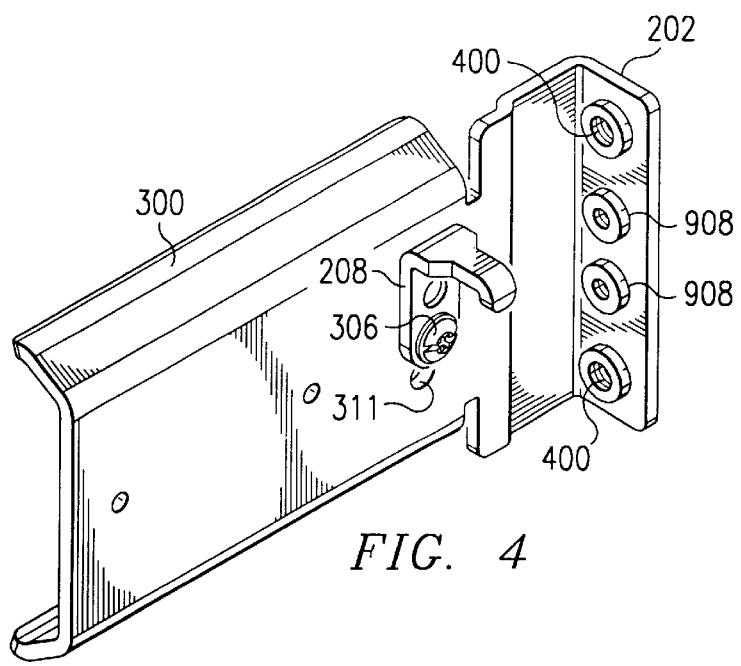
FIG. 4 is an oblique view of the fixed mounting flange of FIG. 1.

It is a further aspect of the invention that rail assembly 100 may be mounted either in racks whose corner posts provide round mounting holes (as in FIG. 6) or in racks whose corner posts provide square mounting holes (as in FIG. 7.) To mount rail assembly 100 in a round-hole rack, fixed rail 102 is positioned between front and rear corner posts 602, 600. (When available, cutouts 604, 606 may be used to first hang the assembly on the rack with hooks 208, 209 as shown.) Depth-adjustable bracket 300 is translated so that corner post engagement surfaces 202, 504 engage the inside surfaces of corner posts 600, 602. Finally, screws 608 are passed through round mounting holes 610 and are engaged with threads 400 (FIG. 4) on corner post engagement surfaces 204, 504. In an embodiment, threads 400 were attached to surfaces 204, 504 using a press-in technique; other suitable methods may be employed to produce the threads or to otherwise engage the screws. To mount rail assembly 100 to a square-hole corner post 700, the same technique is used except that a removable insert 702 is used to center screw 608 within square hole 704. Thus, removable insert 702 (FIG. 7) constitutes a hole shape adaptation feature. In the embodiment shown, removable insert 702 is a centering washer having a raised center portion 800 (FIG. 8) and a through hole 802. Through hole 800 should be just large enough to allow clearance for the stem of screw 608. Raised portion 800 should be large enough to just fit inside square hole 704 while still allowing a small amount of play.

Figure 9:
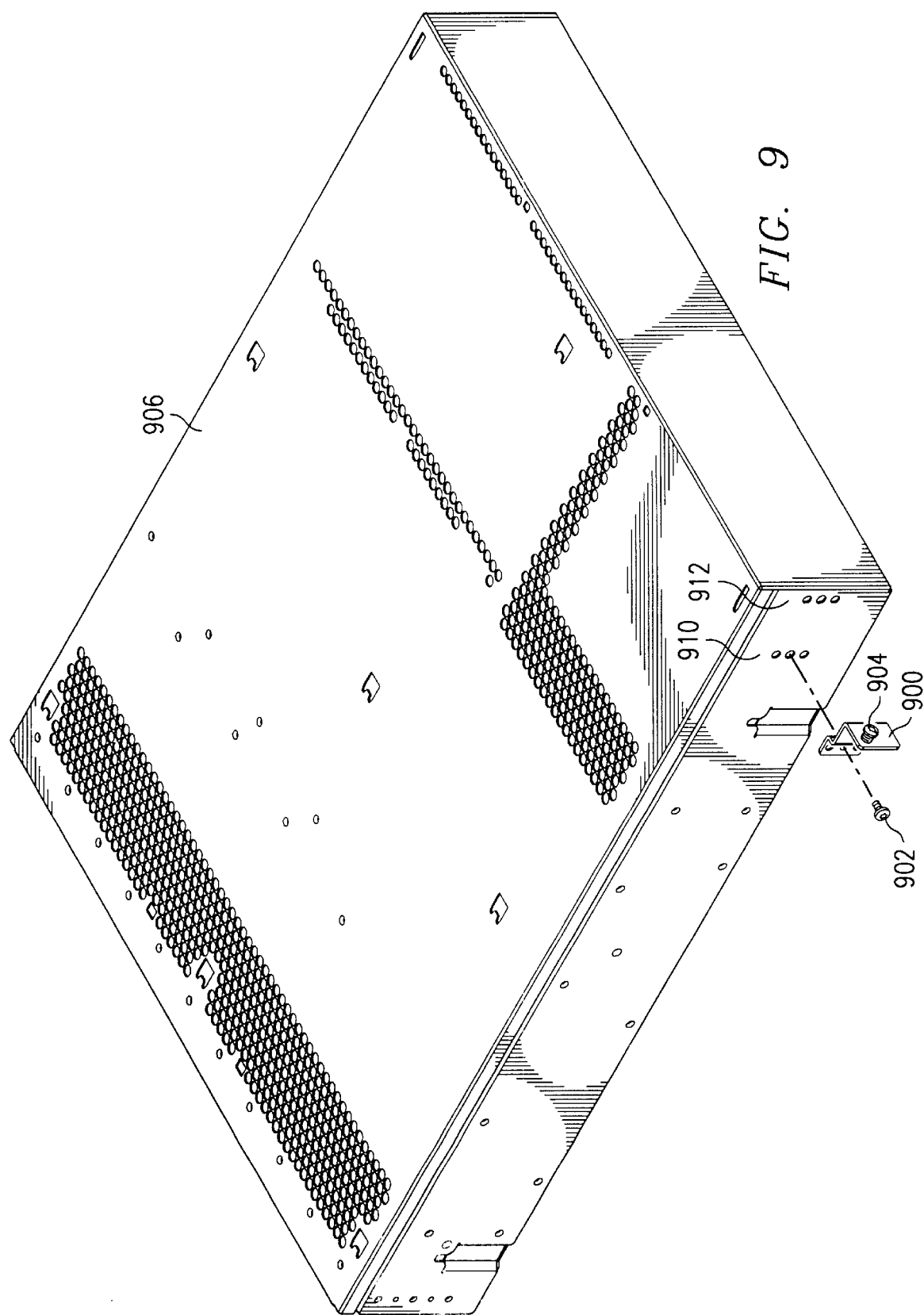
FIG. 9 is an exploded view of a computer enclosure and a securing tab according to a preferred embodiment of the invention.

In a still further aspect of the invention, a retaining tab 900 (FIGS. 9 and 10) may be mounted to the side of a computer enclosure 906 using a screw 902. Once the computer enclosure has been secured to slide rail assembly 100, the computer and rail are retracted into the rack. When the computer and rail are retracted, spring-loaded captive screw 904 is aligned (through one of the holes in the rack corner post) with one of two sets of threads 908 on the end of rail assembly 100. Screw 904 may then be engaged with threads 908 by pushing it through the corresponding hole in the corner post. Retaining tab 900 may easily be removed from position 910 on the computer enclosure and reinstalled into an alternative position such as position 912. The ability to move tab 900 in this way constitutes a rack depth adjustment feature. As was the case with threads 400, press-ins or other suitable techniques may be used to produce threads 908.

While the invention has been described herein with reference to a particular embodiment, the illustrated embodiment has been shown by way of example and not by way of limitation. Persons having ordinary skill in the art and having reference to this specification will appreciate that various alternative embodiments may be created while remaining within the scope of the following claims and their equivalents.

What is claimed is:

1. An adjustable slide rail assembly for mounting a computer in a rack, comprising:
   a slide rail assembly;
   a mounting system for attaching the slide rail assembly to corner posts of the rack, the mounting system comprising a first rack depth adjustment feature and a corner post hole shape adaptation feature;
   a hook on the slide rail assembly operable to hang the slide rail assembly on one of the corner posts while components of the mounting system are secured thereto, the hook comprising a rack width adjustment feature; and
   a retaining tab on the computer for engaging one of the corner posts after the slide rail assembly and computer have been positioned in the rack, the retaining tab comprising a second rack depth adjustment feature.

2. The adjustable slide rail assembly of claim 1:
   wherein the first rack depth adjustment feature comprises a corner post engagement surface capable of translational movement in the longitudinal direction of the slide rail assembly.

3. The adjustable slide rail assembly of claim 2:
   wherein the translational excursion of the corner post engagement surface is guided by a channel formed within the slide rail assembly.

4. The adjustable slide rail assembly of claim 3:
   wherein the corner post engagement surface is coupled to the channel with a screw and a spring washer.

5. The adjustable slide rail assembly of claim 1:
   wherein the corner post hole shape adaptation feature comprises a removable insert, the insert capable of fitting into a square hole in one of the corner posts and having a clearance hole formed therein through which a fastener stem may pass.

6. The adjustable slide rail assembly of claim 5:
   wherein the removable insert comprises a centering washer having a circular protrusion for engaging inside surfaces of the square hole.

7. The adjustable slide rail assembly of claim 1:
   wherein the rack width adjustment feature comprises removability of the hook such that the slide rail assembly fits into a relatively narrower rack having a first width when the hook is removed but fits into a relatively wider rack having a second width that is larger than said first width when the hook is present.

8. The adjustable slide rail assembly of claim 7:
   wherein the hook is removably attached to the slide rail assembly with a screw.

9. The adjustable slide rail assembly of claim 1:
   wherein the second rack depth adjustment feature comprises the ability to move the retaining tab from a first mounting position on the computer to an alternative mounting position on the computer.

10. The adjustable slide rail assembly of claim 9:
    wherein the retaining tab is removably attached to the computer with a screw.

* * * * *